US008521942B2

(12) United States Patent
Bhesania et al.

(10) Patent No.: US 8,521,942 B2
(45) Date of Patent: Aug. 27, 2013

(54) HID OVER SIMPLE PERIPHERAL BUSES

(75) Inventors: Firdosh K. Bhesania, Kirkland, WA (US); Arvind R. Aiyar, Kirkland, WA (US); Randall E. Aull, Kenmore, WA (US); David Abzarian, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 13/053,104

(22) Filed: Mar. 21, 2011

(65) Prior Publication Data
US 2012/0246377 A1  Sep. 27, 2012

(51) Int. Cl.
G06F 13/00 (2006.01)

(52) U.S. Cl.
USPC .............................................. 710/313; 710/15

(58) Field of Classification Search
USPC .................. 710/9, 15, 36, 107, 306, 313, 315
See application file for complete search history.

(56) References Cited

U.S. PATENT DOCUMENTS

| 5,892,933 | A | 4/1999 | Voltz |
| 6,263,392 | B1 | 7/2001 | McCauley |
| 6,311,228 | B1 | 10/2001 | Ray |
| 6,363,437 | B1 | 3/2002 | Ptasinski et al. |
| 6,678,830 | B1 | 1/2004 | Mustafa et al. |
| 6,813,650 | B1 | 11/2004 | Cato et al. |
| 7,660,611 | B1 | 2/2010 | Asbury et al. |
| 2002/0167932 | A1 | 11/2002 | McGowan |
| 2003/0054880 | A1 | 3/2003 | Lam et al. |
| 2003/0188100 | A1 | 10/2003 | Solomon et al. |
| 2004/0203363 | A1 | 10/2004 | Carlton et al. |
| 2004/0225902 | A1 | 11/2004 | Cesare et al. |
| 2005/0182612 | A1 | 8/2005 | Anderson et al. |
| 2005/0229000 | A1 | 10/2005 | Shoji et al. |
| 2006/0094461 | A1 | 5/2006 | Hameed et al. |
| 2007/0150560 | A1 | 6/2007 | Zhang et al. |

(Continued)

FOREIGN PATENT DOCUMENTS

| JP | 2004528627 | 9/2004 |
| KR | 1020050065649 A | 6/2005 |
| KR | 20060082653 | 7/2006 |
| KR | 20070020998 | 2/2007 |

OTHER PUBLICATIONS

"AVR328: USB Generic HID Implementation", *Atmel Corporation*, Available at <http://www.atmel.com/dyn/resources/prod_documents/doc7599.pdf>,(2008),pp. 1-13.

(Continued)

*Primary Examiner* — Glenn A Auve
(74) *Attorney, Agent, or Firm* — Wolfe-SBMC

(57) ABSTRACT

In embodiments of human interface device (HID) over simple peripheral buses, a peripheral sensor receives inputs from a peripheral device, and the peripheral sensor implements an HID SPB interface to interface the peripheral device with a computing system via a simple peripheral bus (SPB) in an HID data format. The peripheral sensor can receive extensibility data for a proprietary function of the peripheral device, and communicate the inputs from the peripheral device and the extensibility data via the simple peripheral bus in the computing system. Alternatively or in addition, a peripheral sensor can generate sensor data and the HID SPB interface interfaces the peripheral sensor with the computing system via the simple peripheral bus. The peripheral sensor can then communicate the sensor data as well as extensibility data for a proprietary function of the peripheral sensor via the simple peripheral bus in the HID data format to the computing system.

20 Claims, 5 Drawing Sheets

(56) References Cited

U.S. PATENT DOCUMENTS

| | | |
|---|---|---|
| 2009/0027972 A1 | 1/2009 | Bode |
| 2009/0054069 A1 | 2/2009 | Calnan, III et al. |
| 2009/0077283 A1 | 3/2009 | Grushkevich |
| 2010/0042763 A1 | 2/2010 | Bica |
| 2010/0180067 A1 | 7/2010 | Garcia et al. |

OTHER PUBLICATIONS

"Bridge over Troubled Water: Using USB Connectivity to Integrate Touch Screens in Computing Applications", *Silicon Laboratories, Inc.*, Available at <http://pandatron.cz/ostatni/docufirm/49605.pdf>,(Nov. 3, 2010),pp. 1-7.

"Digital Accelerometer ADXL345", *Analog Devices*, Available at <http://www.sparkfun.com/datasheets/Sensors/Accelerometer/ADXL345.pdf>,(May 2009),24 pages.

"HID Information", Retrieved from: <http://www.usb.org/developers/hidpage/>on Jan. 31, 2011, 3 pages.

"USB human interface device class", Retrieved from: <http://en.wikipedia.org/wiki/USB_human_interface_device_class>on Jan. 31, 2011,5 pages.

Allman, Stuart "Using the HID class eases the job of writing USB device drivers", *EDN* Available at <http://leyenda2.demon.co.uk/mike/projects/USB/HIDProgramming.pdf>,(Sep. 19, 2002),5 pages.

Steiner, Hans-Christoph et al., "A Unified Toolkit for Accessing Human Interface Devices in Pure Data and Max/MSP", in *Proceedings of NIME 2007*, Available at <http://alumni.media.mit.edu/~dmerrill/publications/dmerrill_NIME07-HID.pdf>,(Jun. 2007),4 pages.

"International Search Report", Mailed Date: Oct. 12, 2012, Application No. PCT/US2012/028666, Filed Date: Mar. 11, 2012, Pages 9.

"Documentation I2C Writing-Clients", *Linux Kernel Documentation, Based on Kernel Version 3.1*, retrieved from <http://www.mjmwired.net/kernel/Documentation/i2c/writing-clients> on Dec. 20, 2011,(Nov. 2, 2011), 7 pages.

"Human Interface Device Tutorial", *Silicon Labs*, AN249, retrieved from <http://www.silabs.com/Support%20Documents/TechnicalDocs/AN249.pdf> on Dec. 19, 2011,(Mar. 2011), 52 pages.

"Interface Manual USB HID—I2C", *Coptonix, Berlin, Germany; Rev 1.04*, retrieved from <http://www.coptonix.com/files/USBIICMSHID.pdf> on Dec. 19, 2011,(Oct. 2011), 24 pages.

"USB 120 Driver Free USB to Synchronous Serial I2C Slave Interface", *Firmware Factory*, retrieved from <http://www.firmwarefactory.com/Docs/USB-I2C&20HW145.pdf>on Dec. 19, 2011,(Aug. 26, 2010), 9 pages.

"PCT Search Report and Written Opinion", Application No. PCT/US2013/020501, (Apr. 25, 2013), 9 pages.

"Non-Final Office Action", U.S. Appl. No. 13/345,690, (Jun. 4, 2013), 23 pages.

HID OVER SIMPLE PERIPHERAL BUSES

BACKGROUND

Consumer devices, such as cell phones, media players, and tablet computers, typically enable a platform for peripheral devices that are internally connected over a simple peripheral bus (SPB), such as an inter-integrated circuit ($I^2C$ two-wire interface bus) and/or a serial peripheral interface (SPI) bus. However, these simple peripheral buses do not have defined standards for running devices, such as a touch-screen display, keyboard, mouse input device, sensors, and other HID class devices. Manufacturers of these peripheral devices generally provide proprietary drivers for the peripherals because there is not a standard protocol for these HID class devices to communicate over a simple peripheral bus. A consumer system may include internally connected peripherals from several different third-party manufacturers and hardware vendors, and the corresponding drivers have different interfaces that may pose system integration challenges, introduce system quality deficiencies and stability concerns, and/or limit the ability to perform unified system driver updates and driver validations.

SUMMARY

This Summary introduces simplified concepts of HID over simple peripheral buses, and the concepts are further described below in the Detailed Description and/or shown in the Figures. This Summary should not be considered to describe essential features of the claimed subject matter, nor used to determine or limit the scope of the claimed subject matter.

Embodiments of HID over simple peripheral buses are described. In embodiments, a peripheral sensor receives inputs from a peripheral device, and the peripheral sensor implements an HID SPB interface to interface the peripheral device with a computing system via a simple peripheral bus (SPB) in an HID data format. The data is communicated as HID data structures via the simple peripheral bus, which may be an $I^2C$ data bus, a serial peripheral interface (SPI) data bus, or other type of simple peripheral bus. The peripheral sensor can also receive extensibility data for a proprietary function of the peripheral device, and communicate the inputs from the peripheral device and the extensibility data via the simple peripheral bus in the computing system. The peripheral sensor can indicate that the peripheral device is an HID compatible device to the computing system. The peripheral sensor can also determine a configuration of the peripheral device, and communicate configuration data from the computing system to the peripheral device. Data communication between the peripheral device and the computing system is bi-directional via the peripheral sensor over the simple peripheral bus. Alternatively, data communication between the peripheral sensor and the computing system may be bi-directional, while communication between the peripheral sensor and peripheral device is unidirectional.

In other embodiments, a peripheral sensor can generate sensor data and the HID SPB interface of the peripheral sensor can then interface the peripheral sensor with the computing system via the simple peripheral bus (SPB). The peripheral sensor can then communicate the sensor data as well as extensibility data for a proprietary function of the peripheral sensor via the simple peripheral bus in the HID data format to the computing system. The peripheral sensor can indicate that the sensor is an HID compatible device to the computing system. The peripheral sensor can also communicate configuration information to the computing system, and receive configuration data from the computing system to configure the peripheral sensor.

BRIEF DESCRIPTION OF THE DRAWINGS

Embodiments of HID over simple peripheral buses are described with reference to the following Figures. The same numbers may be used throughout to reference like features and components that are shown in the Figures.

DETAILED DESCRIPTION

Embodiments of HID over simple peripheral buses are described, and provide a protocol for HID devices to communicate with a computing device over a simple peripheral bus (SPB), such as an inter-integrated circuit ($I^2C$ two-wire interface) data bus, a serial peripheral interface (SPI) data bus, or other type of simple peripheral bus. An HID SPB interface is implemented in peripheral sensors, along with an extensibility application, to interface sensors and/or peripheral devices with a computing system. In embodiments, a peripheral sensor may be implemented as a sensor, such as a temperature, accelerometer, gyroscope, compass, or other type of a sensor. In alternate embodiments, peripheral sensors can be implemented to interface peripheral devices with the computing system via a simple peripheral bus (SPB) in an HID data format. Peripheral devices that are interfaced via a peripheral sensor can include a touch panel, such as a tablet computer touch-screen display, and computer input devices, such as a keyboard or mouse input device. The HID SPB interface in a peripheral sensor interfaces the sensor and/or a peripheral device with the computing system.

While features and concepts of HID over simple peripheral buses can be implemented in any number of different devices, systems, environments, networks and/or configurations, embodiments of HID over simple peripheral buses are described in the context of the following example devices, systems, and methods.

Figure 1:
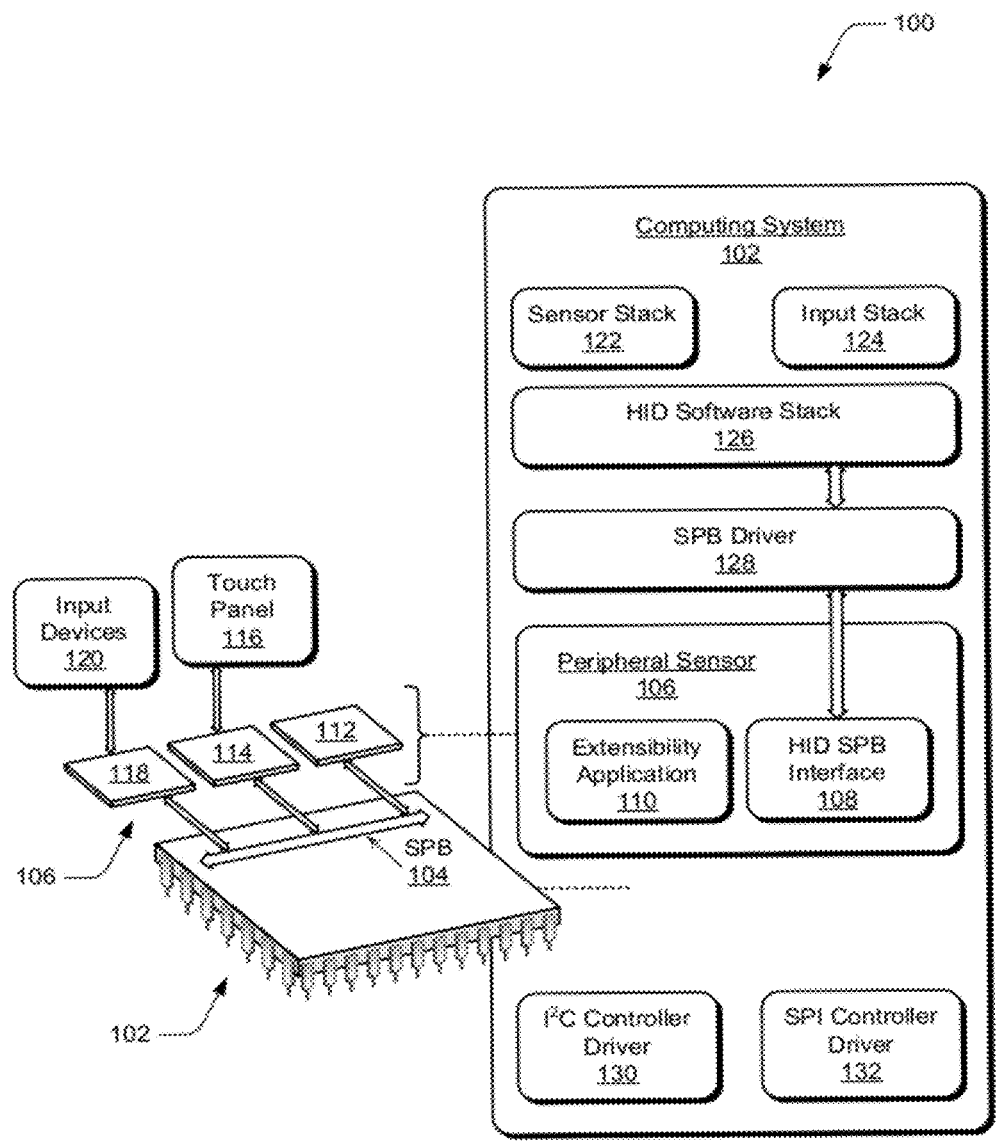
FIG. 1 illustrates an example system in which embodiments of HID over simple peripheral buses can be implemented.

FIG. 1 illustrates an example system 100 in which embodiments of HID over simple peripheral buses can be implemented. The system includes a computing system 102 that can be implemented in any type of computing device, such as a computer, server, communication device, portable device, tablet computer, cell phone, navigation device, media player, gaming device, and the like. In implementations, the computing system may be a system-on-chip (SoC) as described with reference to the example shown in FIG. 2, implemented in an X86-type PC, or as any other type of computing system design. A computing device that includes the computing system 102 can be implemented with various components, such as one or more processors and memory devices, as well as any number and combination of differing components as further described with reference to the example device shown in FIG. 5. Further, the computing system can be implemented with additional components as further described with reference to the example SoC shown in FIG. 2.

The computing system 102 includes a simple peripheral bus (SPB) 104, such as an I²C data bus, a serial peripheral interface (SPI) data bus, or other type of low-power simple peripheral bus. The example system 100 also includes peripheral sensors, represented by peripheral sensor 106 that implements an HID SPB interface 108 along with an extensibility application 110. The HID SPB interface can interface sensors and peripheral devices (e.g., human interface devices (HID)) with a computing system. In embodiments, a peripheral sensor 112 can be implemented as a sensor, such as a temperature, accelerometer, gyroscope, compass, or other type of a sensor. The HID SPB interface 108 of the peripheral sensor 112 interfaces the peripheral sensor with the computing system via the simple peripheral bus.

In alternate embodiments, the HID SPB interface 108 of a peripheral sensor can be implemented to interface peripheral devices with the computing system 102 via the simple peripheral bus (SPB) 104 in an HID data format. The data is communicated as HID data structures via the simple peripheral bus. For example, a peripheral sensor 114 interfaces a touch-panel 116, such as a tablet computer touch-screen display, with the computing system via the simple peripheral bus. In another example, a peripheral sensor 118 interfaces computer input devices, such as a keyboard or mouse input device, with the computing system via the simple peripheral bus.

The peripheral sensor 118 may also interface a sensor with the computing system via the simple peripheral bus. For example, the peripheral sensor is implemented to bridge a sensor output over an I²C interface in the form of HID data. A device manufacturer can implement a device (e.g., touch-panel, input devices, sensors, etc.) to expose its functionality through HID. For example, a touch-screen controller can be implemented to read raw touch sensors, which may be analog sensors, and generate digital signals that are communicated to the CPU. These types of controllers can be updated to expose the touch data to the CPU through an HID protocol.

In this example, a software stack in the computing system 102 includes a sensor stack 122, an input stack 124, and an HID software stack 126. The computing system also includes an SPB driver 128, as well as an I²C controller driver 130 and an SPI controller driver 132. In embodiments, each peripheral sensor 106 (e.g., peripheral sensors 112, 114, and 118) includes the HID SPB interface 108, and the SPB driver that correlates to the I²C controller is implemented to communicate HID data between a peripheral sensor and the HID software stack.

The HID SPB interface 108 and the extensibility application 110 of a peripheral sensor 106 can be implemented as computer-executable instructions, such as in firmware, that are executable to implement embodiments of HID over simple peripheral buses. Alternatively or in addition, the HID SPB interface may be implemented in hardware. In embodiments, the extensibility application of a peripheral sensor that is implemented as a sensor (e.g., temperature, accelerometer, gyroscope, compass, etc.) interfaces extensibility data for proprietary functions and/or features of the sensor with the computing system 102 via the simple peripheral bus (SPB) 104. Similarly, the extensibility application of a peripheral sensor is implemented to interface proprietary functions and/or features of a peripheral device, such as a touch-panel, with the computing system via the simple peripheral bus.

The HID SPB interface 108 establishes peripheral device operability standards. A third-party, independent hardware vendor, can interface a peripheral device via the HID SPB interface 108 of a peripheral sensor 106, yet also differentiate and implement proprietary functions and/or features via the extensibility application 110 of the peripheral sensor.

In embodiments, the HID SPB interface 108 of a peripheral sensor 106 is implemented to indicate (e.g., identify, expose, translate, enumerate, etc.) that a peripheral device and/or sensor is an HID compatible device to the computing system 102. The peripheral sensor can also determine a configuration of the peripheral device (e.g., from data structures, report descriptors, etc.), receive configuration data from the computing system to configure a sensor, and/or communicate configuration data from the computing system to a peripheral device or sensor. HID data communication between a peripheral device or sensor and the computing system is bi-directional via the peripheral sensor over the simple peripheral bus (SPB). The bi-directional communication may be implemented to utilize polling techniques and/or interrupt-based mechanisms. Alternatively, data communication between the peripheral sensor and the computing system may be bi-directional, while communication between the peripheral sensor and peripheral device is unidirectional.

Figure 2:
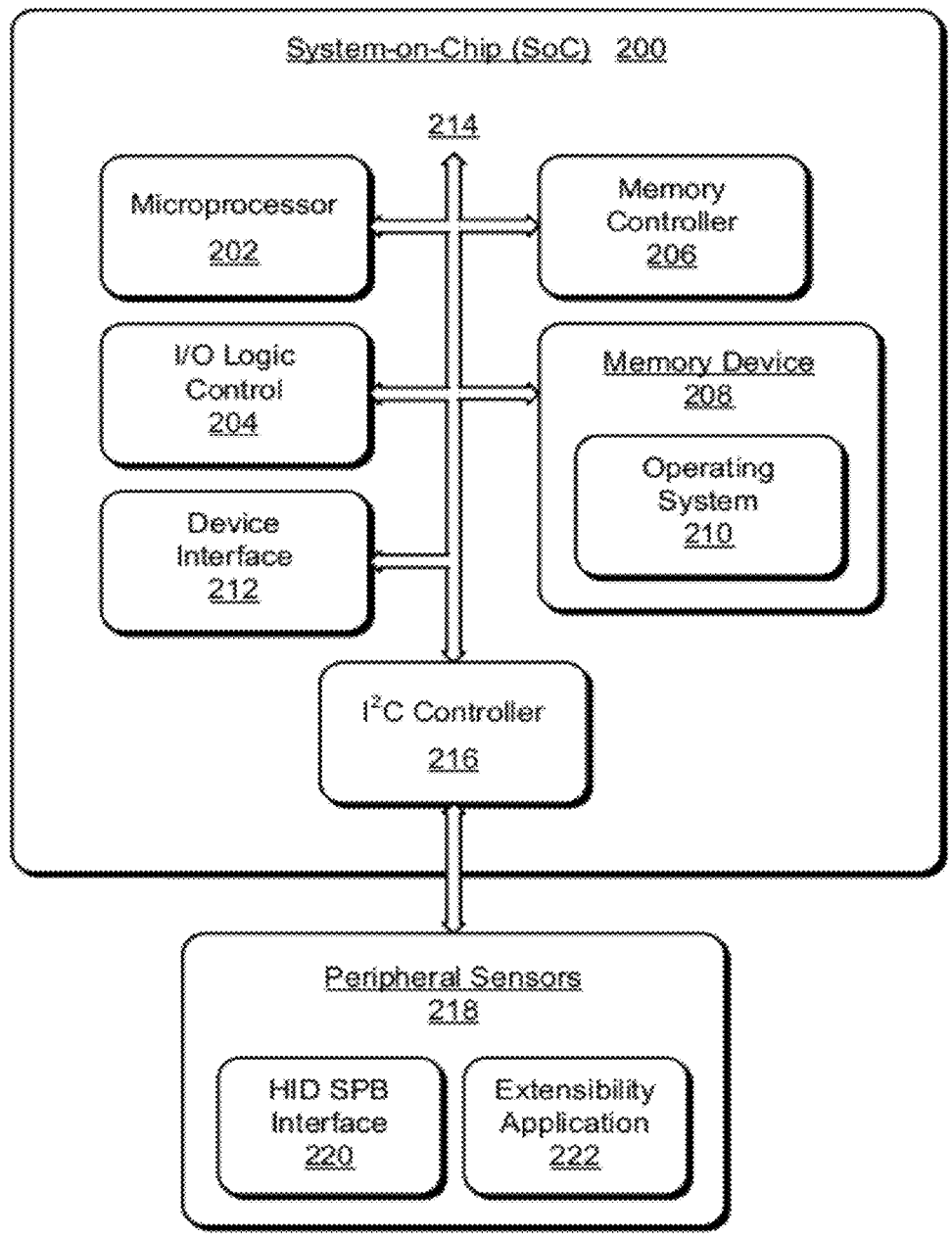
FIG. 2 illustrates an example system-on-chip (SoC) in which embodiments of HID over simple peripheral buses can be implemented.

FIG. 2 illustrates an example system-on-chip (SoC) 200, which can implement various embodiments of HID over simple peripheral buses as described herein. The SoC may be implemented in a fixed or mobile device, such as any one or combination of a consumer, electronic, communication, navigation, media, computing device, and/or other type of electronic device. The SoC 200 can be integrated with electronic circuitry, a microprocessor, memory, input-output (I/O) logic control, communication interfaces and components, as well as other hardware, firmware, and/or software to implement a computing device.

In this example, the SoC 200 is integrated with a microprocessor 202 (e.g., any of a microcontroller or digital signal processor) and input-output (I/O) logic control 204 (e.g., to include electronic circuitry). The SoC 200 also includes a memory controller 206 and a memory device 208, such as any type of a nonvolatile memory and/or other suitable electronic data storage device. The SoC can also include various firmware and/or software, such as an operating system 210 that is maintained by the memory and executed by the microprocessor.

The SoC 200 includes a device interface 212 to interface with a device or other peripheral component, such as when installed in a computing device. The SoC 200 also includes an integrated data bus 214 that couples the various components of the SoC for data communication between the components. The data bus in the SoC can be implemented as a simple peripheral bus (SPB), such as an I²C data bus or a serial peripheral interface (SPI) data bus, and may also be implemented as any one or a combination of different bus structures and/or bus architectures.

In embodiments of HID over simple peripheral buses, the SoC 200 includes an I²C controller 216 that interfaces one or more peripheral sensors 218, such as described with reference to the various examples of peripheral sensors shown in FIG. 1. A peripheral sensor implements an HID SPB interface 220 along with an extensibility application 222. Examples of the HID SPB interface and the extensibility application, as well as corresponding functionality and features, are described with reference to the respective components shown in FIG. 1. Alternatively or in addition, components of the peripheral sensors can be implemented as hardware, firmware, fixed logic circuitry, or any combination thereof that is implemented in connection with the I/O logic control 204 and/or other processing and control circuits of the SoC or peripheral sensors.

Example methods 300 and 400 are described with reference to respective FIGS. 3 and 4 in accordance with one or more embodiments of HID over simple peripheral buses. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
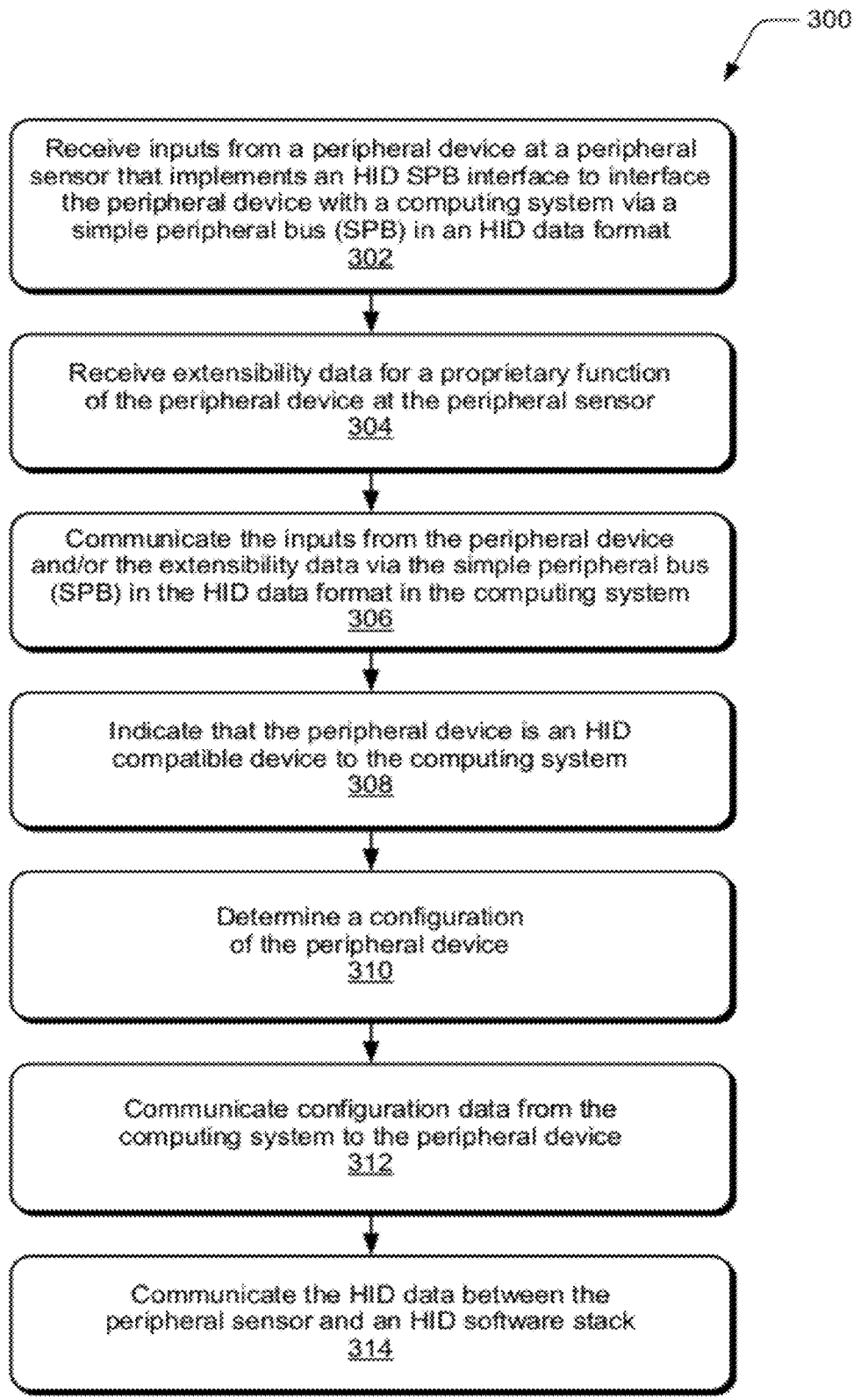
FIG. 3 illustrates example method(s) of HID over simple peripheral buses in accordance with one or more embodiments.

FIG. 3 illustrates example method(s) 300 of HID over simple peripheral buses, and is described with reference to a peripheral sensor implemented as a peripheral device controller. The order in which the method blocks are described are not intended to be construed as a limitation, and any number of the described method blocks can be combined in any order to implement a method, or an alternate method.

At block 302, inputs are received from a peripheral device at a peripheral sensor that implements an HID SPB interface to interface the peripheral device with a computing system via a simple peripheral bus (SPB) in an HID data format. For example, the peripheral sensor 114 (FIG. 1) receives inputs from the touch-panel 116, and the HID SPB interface 108 of the peripheral sensor 114 interfaces the touch-panel with the computing system 102 via the simple peripheral bus (SPB) 104 in an HID data format. Similarly, the peripheral sensor 118 receives inputs from an input device 120, such as a keyboard or mouse input device, and the HID SPB interface 108 of the peripheral sensor 118 interfaces the input device with the computing system 102 via the simple peripheral bus in an HID data format. The simple peripheral bus 104 may be implemented as an $I^2C$ data bus, a serial peripheral interface (SPI) data bus, or as any other type of low-power simple peripheral bus via which data is communicated as HID data structures.

At block 304, extensibility data for a proprietary function of the peripheral device is received at the peripheral sensor. For example, the peripheral sensor 114 receives extensibility data for proprietary functions and/or features of the touch-panel 116, and the extensibility application 110 of the peripheral sensor 114 interfaces the extensibility data with the computing system 102 via the simple peripheral bus (SPB) 104. Similarly, the peripheral sensor 118 receives extensibility data for proprietary functions and/or features of an input device 120, and the extensibility application 110 of the peripheral sensor 118 interfaces the extensibility data with the computing system via the simple peripheral bus.

At block 306, the inputs from the peripheral device and/or the extensibility data is communicated via the simple peripheral bus (SPB) in the HID data format in the computing system. For example, the peripheral sensor 114 communicates the inputs received from the touch-panel 116 and/or communicates the extensibility data for proprietary functions and/or features of the touch-panel via the simple peripheral bus (SPB) 104 in the HID data format in the computing system 102. Similarly, the peripheral sensor 118 communicates the inputs received from the input device 120 and/or communicates the extensibility data for proprietary functions and/or features of the input device via the simple peripheral bus in the HID data format in the computing system.

At block 308, the peripheral device is identified as an HID compatible device to the computing system and, at block 310, a configuration of the peripheral device is determined. For example, the peripheral sensor 114 identifies the touch-panel 116 as an HID compatible device to the computing system 102 and determines configuration information for the touch-panel. Similarly, the peripheral sensor 118 identifies an input device 120 as an HID compatible device to the computing system and determines configuration information for the input device. A peripheral sensor maintains HID application compatibility with a peripheral device.

At block 312, configuration data from the computing system is communicated to the peripheral device. For example, the peripheral sensor 114 receives configuration data from the computing system 102 and communicates the configuration data to the touch-panel 116. Similarly, the peripheral sensor 118 receives configuration data from the computing system and communicates the configuration data to an input device 120. The data communication between a peripheral device and the computing system is bi-directional via a peripheral sensor over the simple peripheral bus using HID reporting protocols. Alternatively, data communication between the peripheral sensor and the computing system may be bi-directional, while communication between the peripheral sensor and peripheral device is unidirectional.

At block 314, the HID data is communicated between an HID software stack and the peripheral sensor. For example, the SPB driver 128 communicates the HID data in the computing system 102 between the peripheral sensor 114 and the HID software stack 126. Similarly, the SPB driver communicates the HID data in the computing system between the peripheral sensor 118 and the HID software stack.

Figure 4:
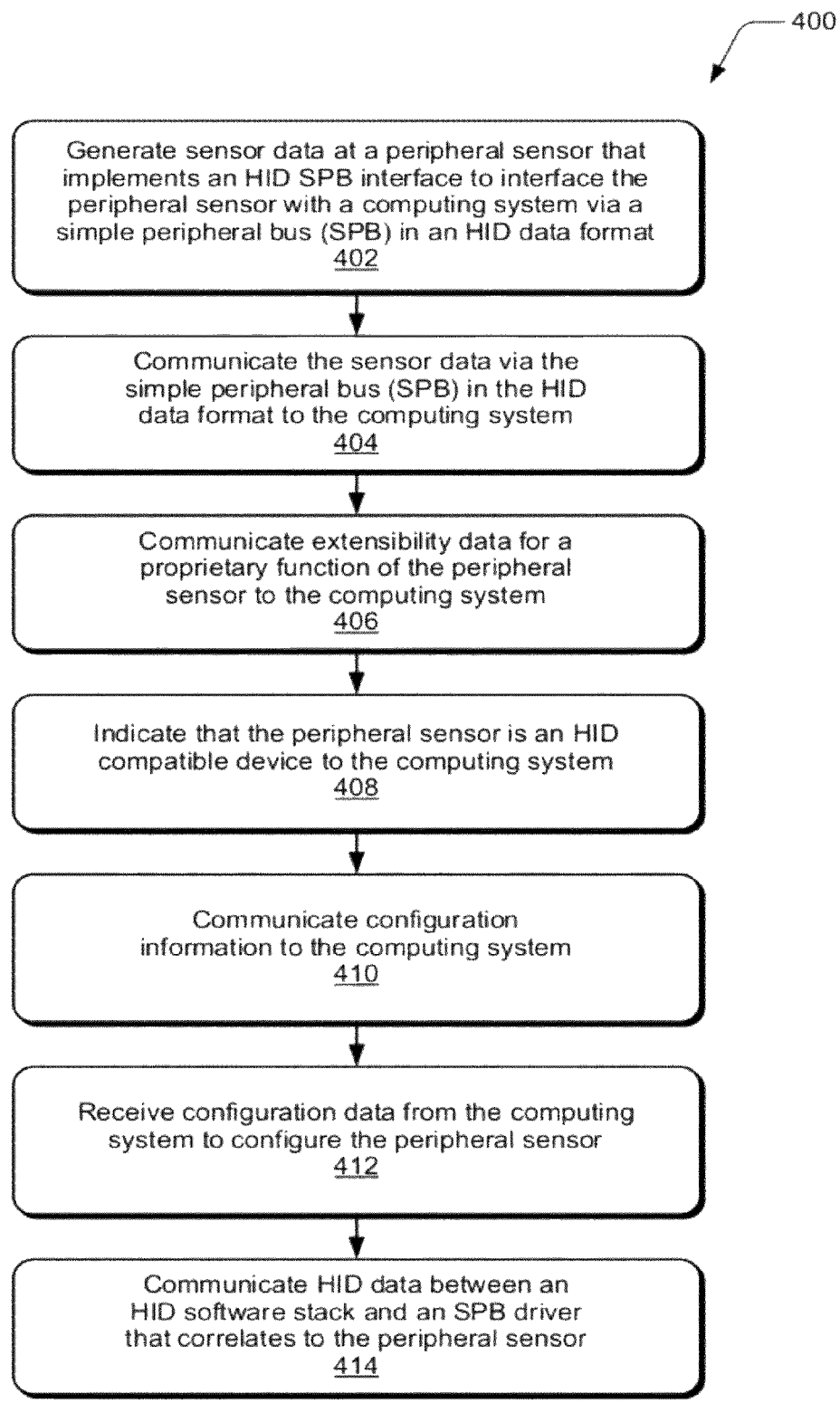
FIG. 4 illustrates example method(s) of HID over simple peripheral buses in accordance with one or more embodiments.

FIG. 4 illustrates example method(s) 400 of HID over simple peripheral buses, and is described with reference to a peripheral sensor implemented as a sensor, such as a temperature sensor, accelerometer, gyroscope, compass, etc. The order in which the method blocks are described are not intended to be construed as a limitation, and any number of the described method blocks can be combined in any order to implement a method, or an alternate method.

At block 402, sensor data is generated at a peripheral sensor that implements an HID SPB interface to interface the peripheral sensor with a computing system via a simple peripheral bus (SPB) in an HID data format. For example, the peripheral sensor 112 (FIG. 1) generates sensor data, and the HID SPB interface 108 of the peripheral sensor 112 interfaces the sensor with the computing system 102 via the simple peripheral bus (SPB) 104 in an HID data format. The simple peripheral bus 104 may be implemented as an $I^2C$ data bus, a serial peripheral interface (SPI) data bus, or as any other type of low-power simple peripheral bus via which data is communicated as HID data structures.

At block 404, the sensor data is communicated via the simple peripheral bus (SPB) in the HID data format to the computing system. For example, the peripheral sensor 112 communicates the sensor data via the simple peripheral bus (SPB) 104 in the HID data format to the computing system 102. At block 406, extensibility data for a proprietary function of the peripheral sensor is communicated to the computing system. For example, the peripheral sensor 112 communicates extensibility data for proprietary functions and/or features of the sensor via the simple peripheral bus in the HID data format in the computing system.

At block 408, the peripheral sensor is identified as an HID compatible device to the computing system and, at block 410, configuration information is communicated to the computing system. For example, the peripheral sensor 112 identifies the sensor as an HID compatible device to the computing system 102 and communicates configuration information for the sensor to the computing system.

At block 412, configuration data is received from the computing system to configure the peripheral sensor. For example, the peripheral sensor 112 receives configuration data from the computing system 102 to configure or initialize the sensor. Data communication between the sensor and the computing system is bi-directional over the simple peripheral bus (SPB). At block 414, HID data is communicated between an HID software stack and the peripheral sensor. For example, the SPB driver 128 communicates the HID data in the computing system 102 between the peripheral sensor 112 and the HID software stack 126.

Figure 5:
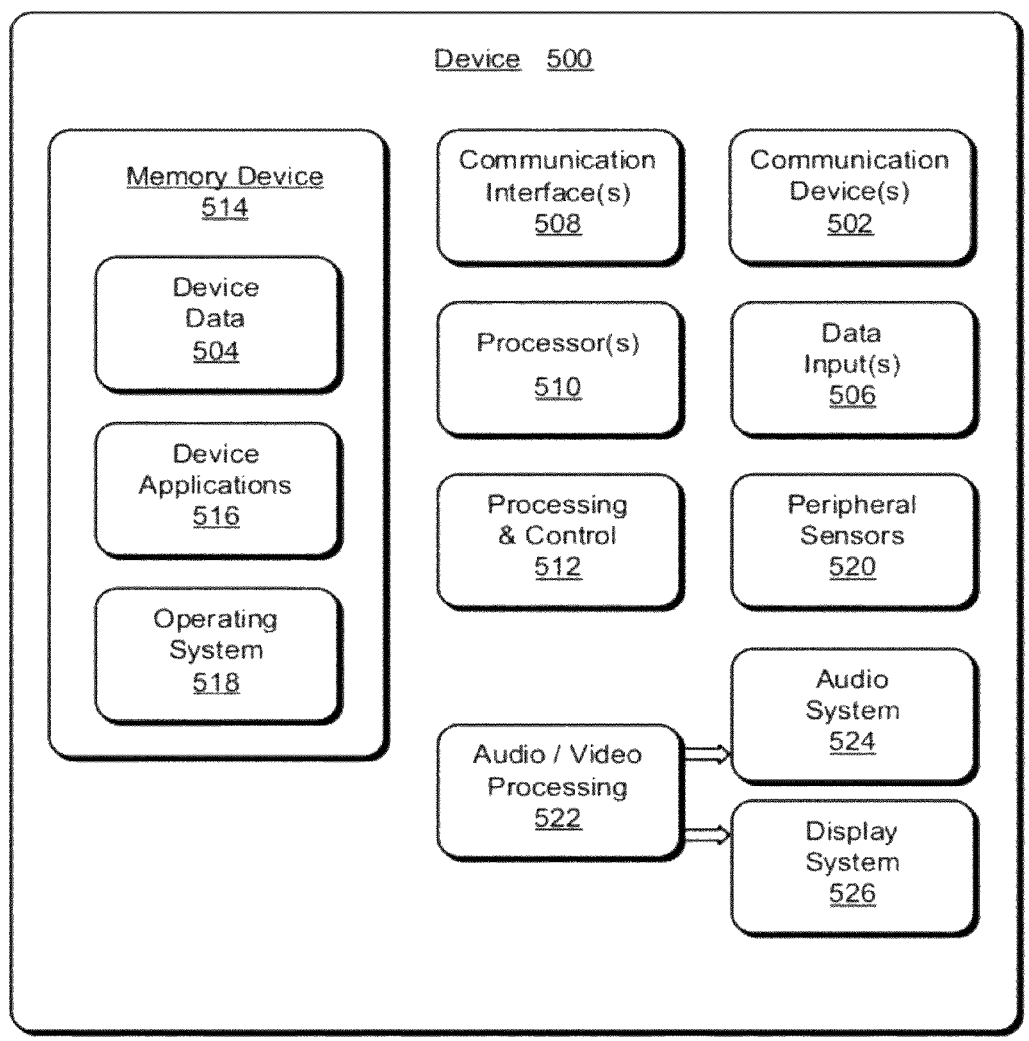
FIG. 5 illustrates various components of an example device that can implement embodiments of HID over simple peripheral buses.

FIG. 5 illustrates various components of an example device 500 that can be implemented as any of the devices, or services and software implemented by devices, described with reference to the previous FIGS. 1-4. In embodiments, the device may be implemented as any one or combination of a fixed or mobile device, in any form of a consumer, computer, server, portable, user, communication, phone, navigation, television, appliance, gaming, media playback, camera, and/or electronic device. The device may also be associated with a user (i.e., a person) and/or an entity that operates the device such that a device describes logical devices that include users, software, firmware, hardware, and/or a combination of devices.

The device 500 includes communication devices 502 that enable wired and/or wireless communication of device data 504, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 506 via which any type of data, media content, and/or inputs can be received, such as user-selectable inputs, messages, communications, music, television content, recorded video content, and any other type of audio, video, and/or image data received from any content and/or data source.

The device 500 also includes communication interfaces 508, such as any one or more of a serial, parallel, network, or wireless interface. The communication interfaces provide a connection and/or communication links between the device and a communication network by which other electronic, computing, and communication devices communicate data with the device.

The device 500 includes one or more processors 510 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 512. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 500 also includes one or more memory devices 514 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 514 provides data storage mechanisms to store the device data 504, other types of information and/or data, and various device applications 516. For example, an operating system 518 can be maintained as a software application with a memory device and executed on the processors. The device applications may also include a device manager, such as any form of a control application, software application, signal processing and control module, code that is native to a particular device, a hardware abstraction layer for a particular device, and so on. In this example, the device includes one or more peripheral sensors 520 that implement embodiments of HID over simple peripheral buses as described herein.

The device 500 also includes an audio and/or video processing system 522 that generates audio data for an audio system 524 and/or generates display data for a display system 526. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of HID over simple peripheral buses have been described in language specific to features and/or methods, the subject of the appended claims is not necessarily limited to the specific features or methods described. Rather, the specific features and methods are disclosed as example implementations of HID over simple peripheral buses.

The invention claimed is:

1. A system, comprising:
   a simple peripheral bus (SPB) configured for data communication between components in a computing system, the simple peripheral bus configured as one of an inter-integrated circuit (I2C) or a serial peripheral interface (SPI) data bus; and
   peripheral sensors implemented with a human interface device (HID) SPB interface, each of the peripheral sensors configured to interface a peripheral device with the computing system via the simple peripheral bus in an HID data format.

2. A system as recited in claim 1, wherein a peripheral sensor is further configured to communicate extensibility data for a proprietary function of the peripheral device in the computing system via the simple peripheral bus.

3. A system as recited in claim 1, wherein a peripheral sensor is further configured to indicate that the peripheral device is an HID compatible device to the computing system, and determine a configuration of the peripheral device.

4. A system as recited in claim 1, wherein a peripheral sensor is further configured for bi-directional data communication from the peripheral device to the computing system, and from the computing system to the peripheral device using HID reporting protocols.

5. A system as recited in claim 1, wherein a peripheral sensor is further configured to maintain HID application compatibility with a peripheral device.

6. A system as recited in claim 1, wherein the peripheral sensors include at least one of a sensor or peripheral device controller.

7. A system as recited in claim 1, wherein the peripheral sensors are further configured to communicate data as HID data structures via the simple peripheral bus.

8. A system as recited in claim 1, further comprising an SPB driver configured to communicate HID data between a peripheral sensor and an HID software stack.

9. A computer-implemented method, comprising:
   receiving inputs from a peripheral device at a peripheral sensor that implements a human interface device (HID) SPB interface to interface the peripheral device with a computing system via a simple peripheral bus (SPB) in an HID data format, the simple peripheral bus configured as an inter-integrated circuit (I2C);
   receiving extensibility data for a proprietary function of the peripheral device at the peripheral sensor; and
   communicating the inputs from the peripheral device and the extensibility data via the simple peripheral bus in the HID data format in the computing system.

10. A method as recited in claim 9, further comprising indicating that the peripheral device is an HID compatible device to the computing system.

11. A method as recited in claim 9, further comprising determining a configuration of the peripheral device.

12. A method as recited in claim 9, further comprising communicating configuration data from the computing system to the peripheral device.

13. A method as recited in claim 9, further comprising maintaining HID application compatibility with the peripheral device.

14. A method as recited in claim 9, further comprising communicating data as HID data structures via the simple peripheral bus.

15. A method as recited in claim 9, further comprising communicating HID data between the peripheral sensor and an HID software stack.

16. A method, comprising:
    generating sensor data at a peripheral sensor that implements a human interface device (HID) SPB interface to interface the peripheral sensor with a computing system via a simple peripheral bus (SPB) in an HID data format, the simple peripheral bus configured as a serial peripheral interface (SPI) data bus;
    communicating the sensor data via the simple peripheral bus in the HID data format to the computing system; and
    communicating extensibility data for a proprietary function of the peripheral sensor to the computing system.

17. A method as recited in claim 16, further comprising indicating that the peripheral sensor is an HID compatible device to the computing system.

18. A method as recited in claim 16, further comprising:
    communicating configuration information to the computing system; and
    receiving configuration data from the computing system to configure the peripheral sensor.

19. A method as recited in claim 16, wherein the simple peripheral bus is at least one of an inter-integrated circuit (I2C) data bus or the serial peripheral interface (SPI) data bus.

20. A method as recited in claim 16, further comprising communicating HID data between the peripheral sensor and an HID software stack.

* * * * *